UNITED STATES PATENT OFFICE.

JULIUS WEISE, OF WIESBADEN, AND FRIEDRICH RIECHE, OF OESTRICH-ON-THE-RHINE, GERMANY, ASSIGNORS TO THE FIRM OF RUDOLPH KOEPP & CO., CHEMISCHE FABRIK, OF OESTRICH-ON-THE-RHINE, GERMANY.

PRODUCTION OF MIXTURES OF NITROGEN AND HYDROGEN SUITABLE FOR THE MANUFACTURE OF AMMONIA.

1,098,139.  Specification of Letters Patent.  Patented May 26, 1914.

No Drawing.  Application filed January 26, 1914.  Serial No. 814,558.

*To all whom it may concern:*

Be it known that we, JULIUS WEISE and FRIEDRICH RIECHE, both subjects of the German Emperor, and residents, respectively, of Wiesbaden and Oestrich-on-the-Rhine, Germany, have invented certain new and useful Improvements in the Production of Mixtures of Nitrogen and Hydrogen Suitable for the Manufacture of Ammonia, of which the following is a specification.

Gaseous mixtures of nitrogen and hydrogen for use in catalytically converting nitrogen and hydrogen into ammonia have hitherto been produced by the alternate oxidation and reduction of suitable substances, such for instance as copper, for obtaining nitrogen, and iron for obtaining hydrogen, the nitrogen being obtained from nitrogen and oxygen mixtures and the hydrogen from steam. Such processes for the production of such mixtures, are expensive as they must be carried out at high temperatures, which cause rapid wear of the retorts and of the furnace materials and rapid deterioration of the contact mass used in generating the hydrogen. We have overcome these disadvantages by the hereinafter described process, of producing mixtures of nitrogen and hydrogen suitable for the synthetic production of ammonia while simultaneously obtaining valuable by-products.

This improved process consists in producing formates by the action of gases containing carbon monoxid and nitrogen (for instance producer gas) on alkali, either in solution or in a solid form, the operations being further carried on until oxalates are formed. Nitrogen is evolved during the production of the formates and hydrogen is liberated during the formation of oxalates.

The formation of oxalates may be effected in the presence of the nitrogen separated in the formation of the formates, and the final mixture of nitrogen and hydrogen be thus at once obtained, but it is preferable for the purpose of securing a suitably proportioned mixture, to separate the nitrogen obtained during the first part of the process and to mix this nitrogen with the hydrogen liberated during the second part of the process. As the formation of the formate takes place under pressure, the nitrogen can be preserved in a highly compressed state and be subsequently mixed with the hydrogen, whereby a highly compressed gaseous mixture is obtained, such a mixture being of especial advantage for the synthetic production of ammonia.

The specification of the German Patent No. 204895 proposes to use, as fuel, hydrogen liberated in the conversion of formates into oxalates, but in contradistinction thereto, according to this invention, nitrogen and hydrogen are obtained at the same place and in the same operation, in the form of a gaseous mixture suitable for the synthetic production of ammonia and at the same time a highly valuable by-product, (namely an oxalate) is obtained, and therefore the mixture of nitrogen and hydrogen is produced at very small cost.

The following examples will serve to illustrate how this invention can be performed, but it is not limited thereto.

Example 1: A heated vessel capable of withstanding pressure is filled with caustic soda and producer gas is passed thereinto under pressure. The carbon monoxid of the producer gas is absorbed by the caustic soda, and sodium formate is thereby formed while nitrogen is blown out of the receptacle simultaneously with the air present therein. When the nitrogen is free from oxygen and as long as it is freed from carbon monoxid on account of a sufficient excess of caustic soda, it is collected in a gas holder. When the whole of the caustic soda is converted into formate, the supply of gas from the producer is discontinued and the temperature in the receptacle is raised so that the sodium formate is converted into sodium oxalate, and at this stage of the operation hydrogen is evolved and is collected in the gas holder containing the nitrogen, the proportion being preferably one part of nitrogen to three parts of hydrogen.

Example 2: A solution of 80 kilograms of caustic soda in 400 liters of water is introduced into a vessel provided with a stirrer, and into this vessel, producer gas is passed, while the solution is being stirred. Formate solution is formed which, on being evaporated to dryness, furnishes 136 kilograms of dry formate, while nitrogen under pressure is evolved and is led to a gas holder. The closed vessel containing the dry formate is heated, and when the formate melts, nitrogen is introduced into the vessel until the air has been replaced by nitrogen. Then the vessel is connected with a second gas holder, and by the reaction which then takes place, about 22 cubic meters of hydrogen (reduced by calculation to 760 millimeters atmospheric pressure and 0° centigrade) are produced which together with the nitrogen is stored in the said second gas holder. When the reaction is completed nitrogen is again supplied from the first gas holder into the reaction vessel in a measured amount of about 7 cubic meters and a mixture of the desired composition is at once obtained in the second gas holder. Then the connection with the gas holder is cut off, the reaction vessel opened, emptied and filled again with formate and so forth. In this mode of working all danger of explosion during the reaction is avoided.

Example 3: Proceed as described in the foregoing Example 2 and draw by means of a pump the hydrogen produced in a reaction vessel free from air, or filled with nitrogen, and compress it in a storage vessel. As the production of formate can generally be effected under a somewhat considerable excess of pressure, the nitrogen can be obtained easily in a compressed state. If the pressure in the hydrogen storage vessel be chosen equal thereto, it is not difficult to further use the two gases in the desired proportion of one to three for the synthetic production of ammonia. In this case too, there is no danger of explosion and there is also the advantage that the energy which is present in the nitrogen compressed at a high pressure can be utilized.

We claim:

1. The process of producing a mixture of nitrogen and hydrogen suitable for use in the manufacture of ammonia which comprises treating an alkali with a compressed gaseous mixture containing nitrogen and carbon monoxid to produce a formate and nitrogen, separating the nitrogen and maintaining it under pressure, heating the resulting formate to convert it into oxalate and set free hydrogen, and combining the resulting hydrogen with the compressed nitrogen to form a compressed gaseous mixture.

2. The process of producing a mixture of nitrogen and hydrogen suitable for use in the manufacture of ammonia which comprises treating caustic soda with a compressed gaseous mixture containing nitrogen and carbon monoxid to produce sodium formate and nitrogen, separating the nitrogen and maintaining it under pressure, heating the resulting formate to convert it into oxalate and set free hydrogen, and combining the resulting hydrogen with the compressed nitrogen to form a compressed gaseous mixture.

In testimony whereof we have signed our names to this specification in the presence of two subscribing witnesses.

JULIUS WEISE.
FRIEDRICH RIECHE.

Witnesses:
MORITZ WETZEL,
ELISABETH HOLLENWERK.